No. 607,475. Patented July 19, 1898.
F. H. RICHARDS.
WEIGHING MACHINE.
(Application filed Sept. 17, 1897.)
(No Model.) 7 Sheets—Sheet 1.
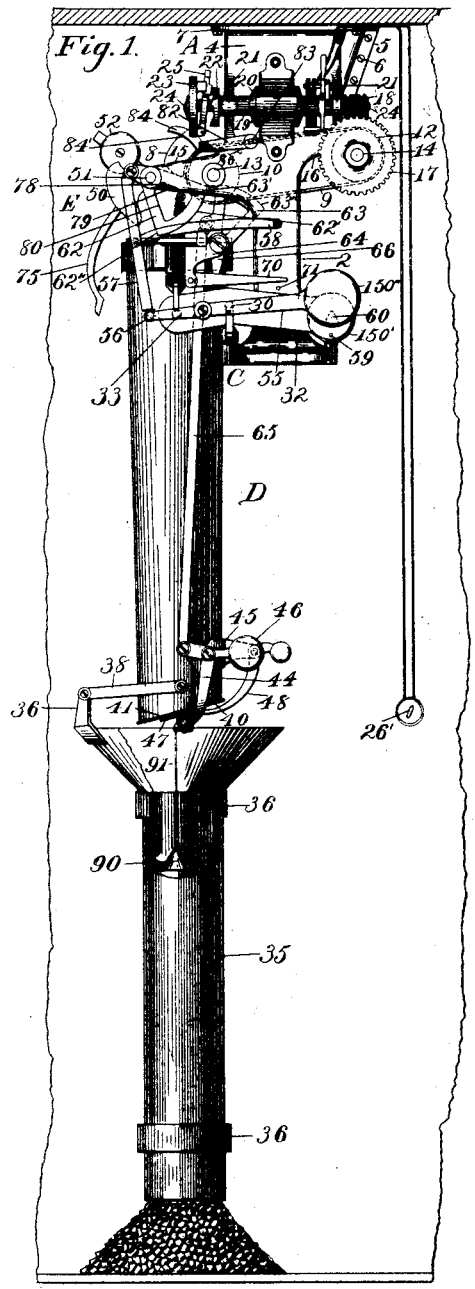
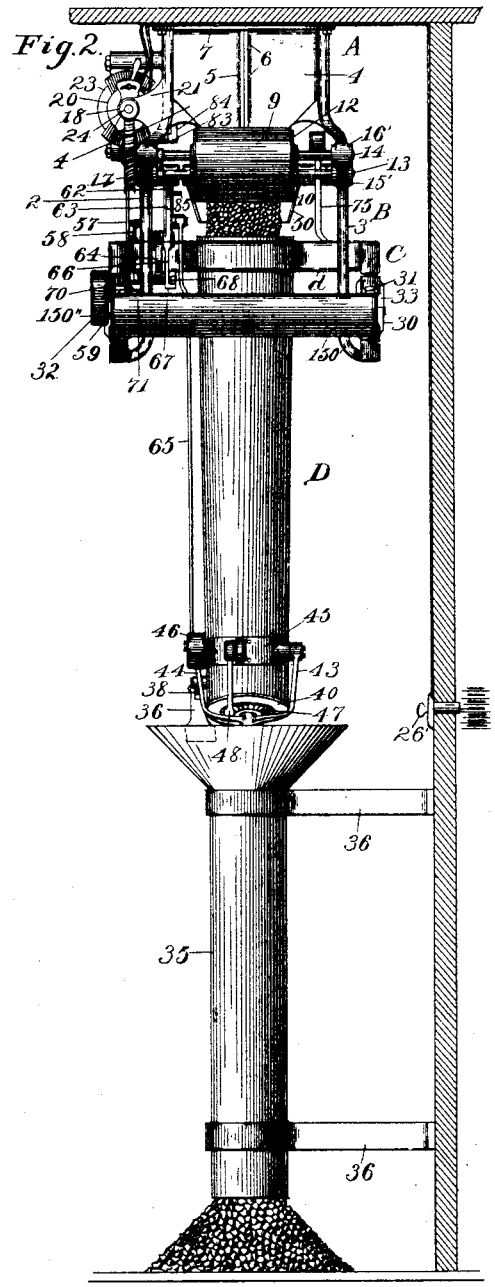
Witnesses.
R. W. Pittman
C. P. Heed
Inventor
F. H. Richards.

No. 607,475. Patented July 19, 1898.
F. H. RICHARDS.
WEIGHING MACHINE.
(Application filed Sept. 17, 1897.)
(No Model.) 7 Sheets—Sheet 2.
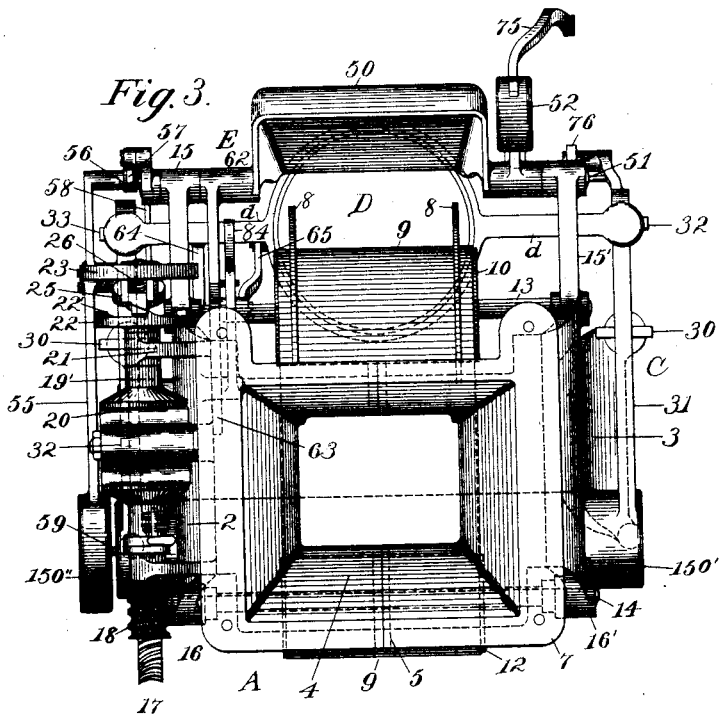
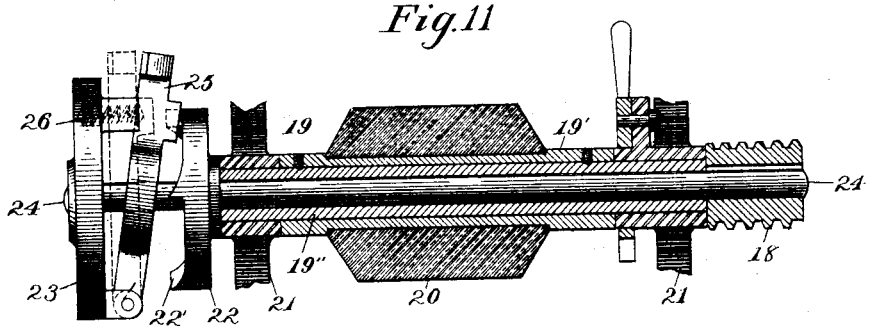
Witnesses. Inventor.

No. 607,475. Patented July 19, 1898.
F. H. RICHARDS.
WEIGHING MACHINE.
(Application filed Sept. 17, 1897.)
(No Model.) 7 Sheets—Sheet 3.
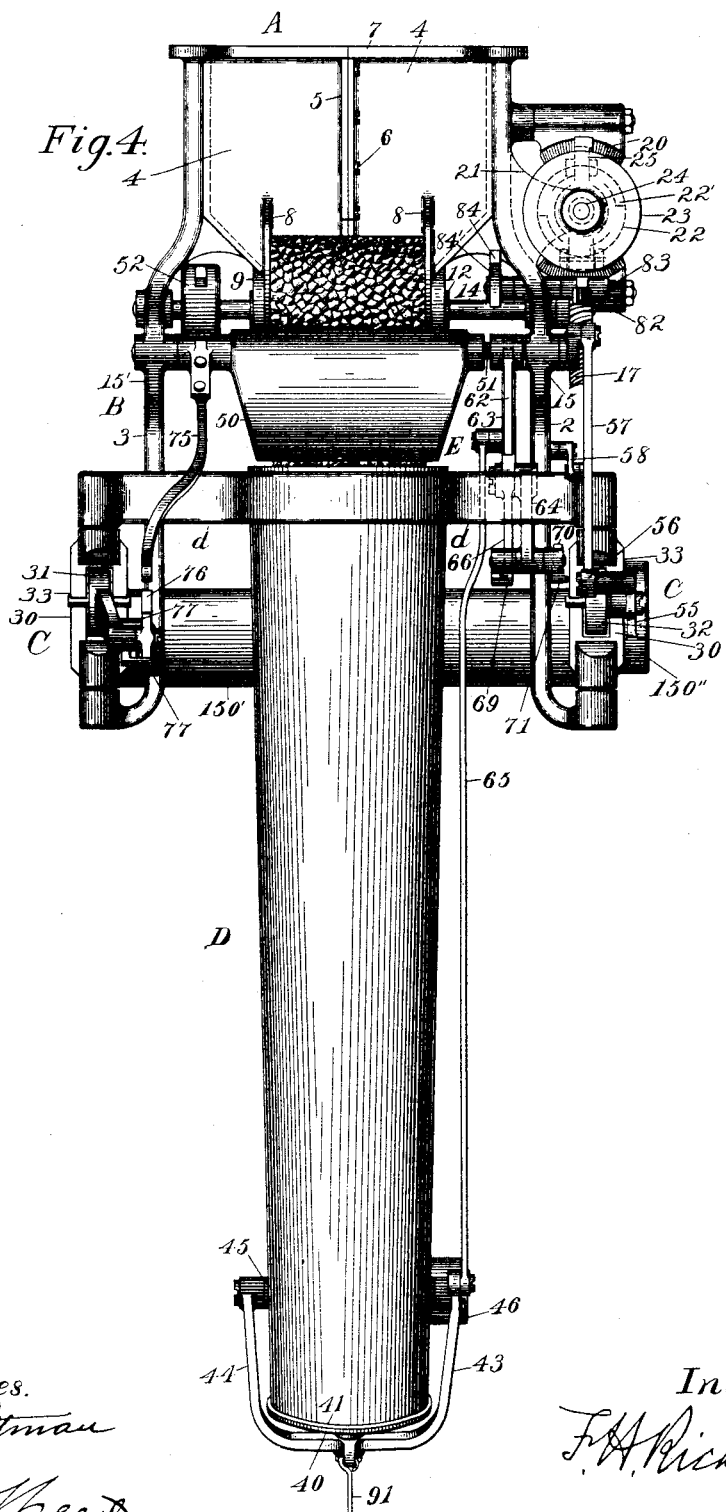
Witnesses.
R. W. Pittman
C. H. Reed
Inventor.
F. H. Richards.

No. 607,475. Patented July 19, 1898.
F. H. RICHARDS.
WEIGHING MACHINE.
(Application filed Sept. 17, 1897.)
(No Model.) 7 Sheets—Sheet 4.

Witnesses. Inventor.

No. 607,475. Patented July 19, 1898.
F. H. RICHARDS.
WEIGHING MACHINE.
(Application filed Sept. 17, 1897.)
(No Model.) 7 Sheets—Sheet 5.

Witnesses.

Inventor.

No. 607,475. Patented July 19, 1898.
F. H. RICHARDS.
WEIGHING MACHINE.
(Application filed Sept. 17, 1897.)
(No Model.) 7 Sheets—Sheet 6.

Witnesses.
R. W. Pittman
C. H. Reed

Inventor.
F. H. Richards.

No. 607,475. Patented July 19, 1898.
F. H. RICHARDS.
WEIGHING MACHINE.
(Application filed Sept. 17, 1897.)
(No Model.) 7 Sheets—Sheet 7.
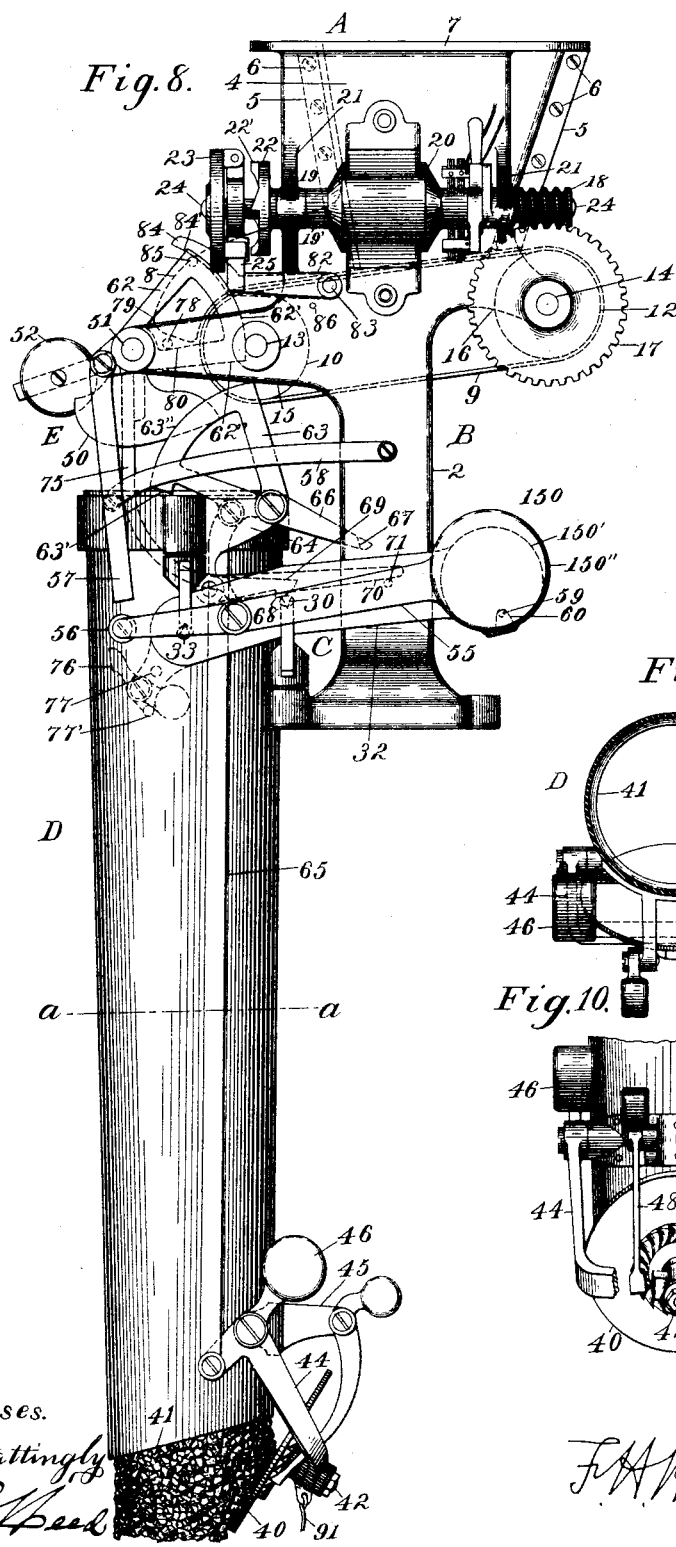
Witnesses.
A. B. Mattingly
Inventor.
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 607,475, dated July 19, 1898.

Application filed September 17, 1897. Serial No. 651,960. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object thereof being to provide an improved depending or hanging weighing-machine comprising an improved organization of mechanisms adapted to weigh various materials, but more particularly adapted for use in weighing fuel.

A further object of the invention is to provide an improved weighing mechanism the load-receiver of which constitutes not only a receptacle for receiving the material to be weighed, but also a conduit or means for conveying the same into position for use, whereby such material can be discharged at or nearer to the place of use or consumption than is possible with the ordinary load-receiver.

A still further object of the invention is to provide a compact weighing apparatus simple in construction but effective in operation and which can be secured directly to the ceiling of a boiler or other room, forming a part of the floor of a storage-room.

Figure 5:
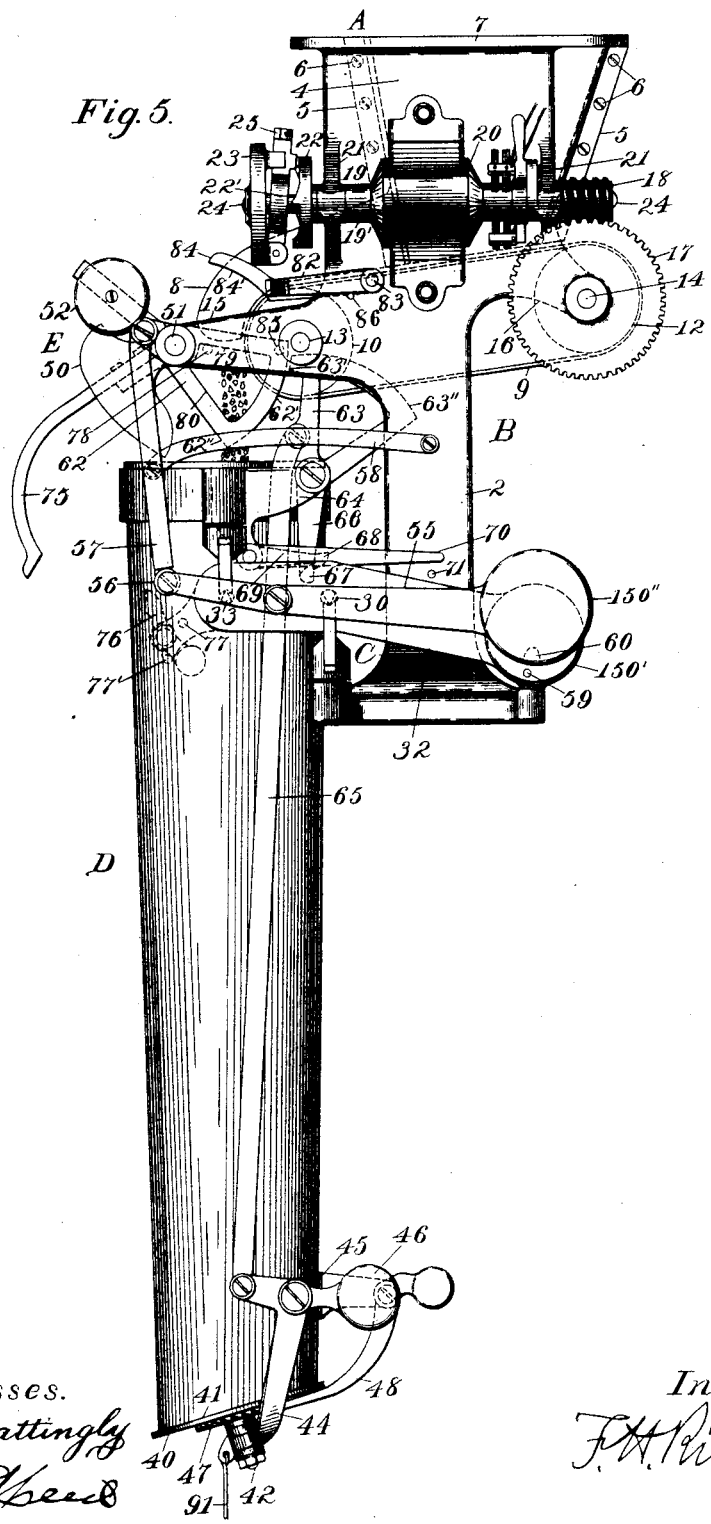
Figure 6:
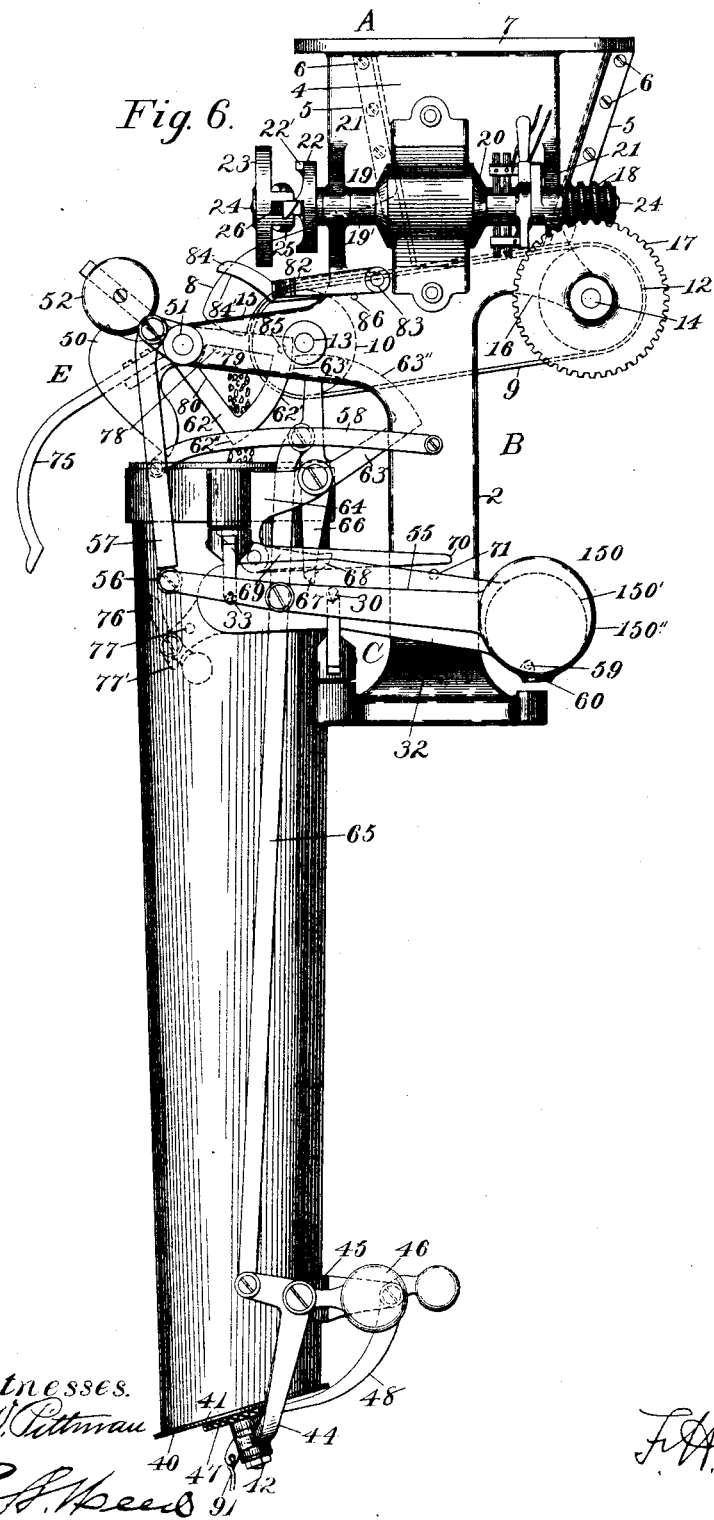
Figure 7:
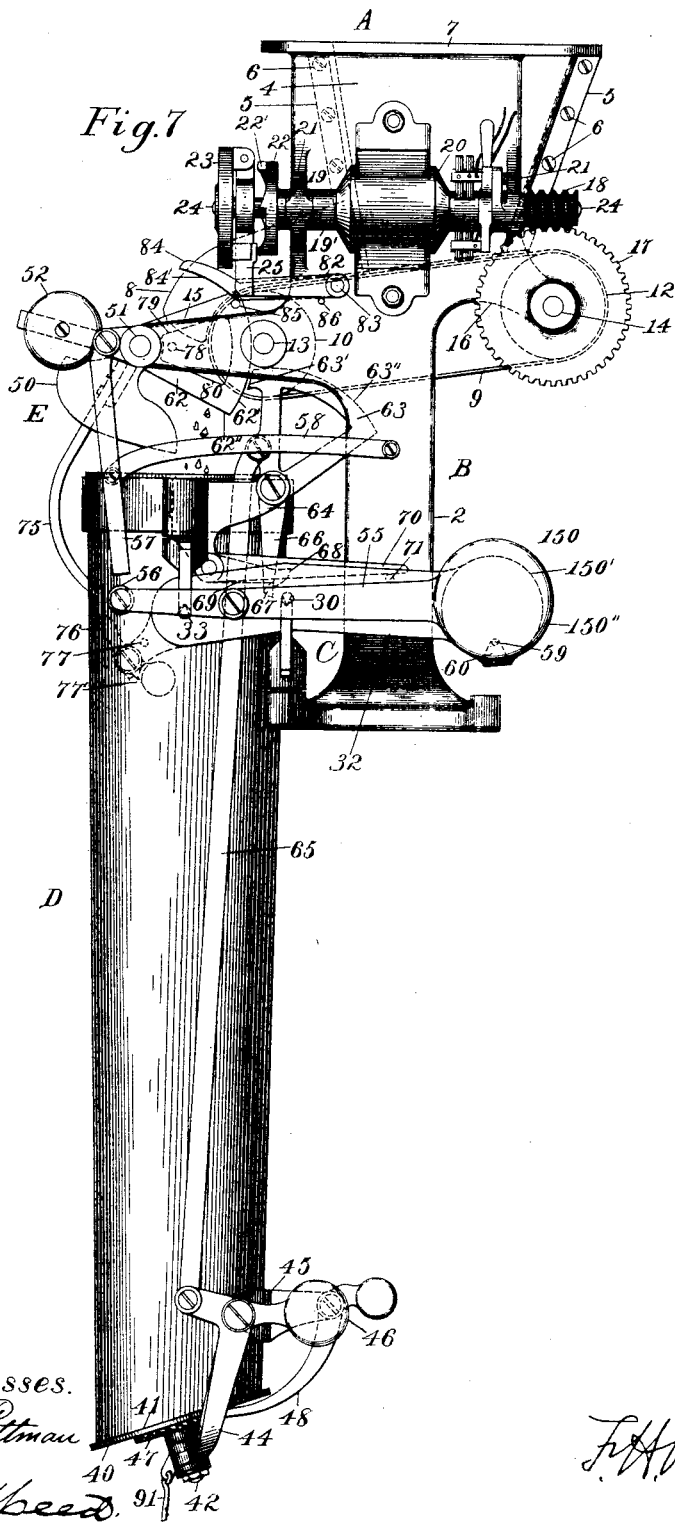

In the drawings accompanying and forming part of this specification, Figure 1 is a side elevation of one form of this improved depending or hanging weighing-machine, the same being shown secured to the ceiling of a boiler-room and the lower end of the machine being disposed above a suitable conduit for conveying the discharged load into position in front of a furnace. Fig. 2 is a rear view of the apparatus shown in Fig. 1. Fig. 3 is an enlarged top view thereof. Fig. 4 is a front view of this construction of weighing-machine. Figs. 5, 6, 7, and 8 are side views of the machine, illustrating different positions of the operative mechanisms. Fig. 9 is a cross-sectional view of the load-receiver, taken in line *a a*, Fig. 8. Fig. 10 is a rear view of the lower part of the load-receiver and its closer mechanism; and Fig. 11 is a longitudinal sectional view of the motor-shaft, together with the driving and driven devices connected therewith.

Similar characters of reference designate like parts in all the figures of the drawings.

The primary object of this invention is to provide an improved organization of mechanisms constituting a depending or hanging automatic weighing-machine which can be secured to the ceiling of a boiler or other room, so that it will be directly beneath the storage-room floor, and thereby permit the improved load-receiver forming a part of such machine to constitute not only a receptacle for receiving and weighing the fuel, but also a conduit or means of conveying such fuel, with or without a supplemental conduit, from the storage-room into position in front of the furnace, so that the same can be directly fed thereto by the stoker.

In a general way this depending or hanging weighing-machine comprises suitable framework (designated generally by A) comprehending a pair of downrights or hangers adapted to be secured to the ceiling of a room and non-supported at their lower ends; load-supply means, (designated in a general way by B,) which comprises a suitable supply-chute, and feeding means for carrying or conveying the material, such as fuel, from the supply-chute into position to load the receiver; weighing mechanism comprising improved beam mechanism (designated in a general way by C) and an improved load-receiver (designated in a general way by D) provided with suitable closer mechanism; valve mechanism (designated in a general way by E) operative in this construction of apparatus to control the operation of the feeding means; means for locking the valve closed when the closer is open and for locking the closer shut when the valve is open, and which locking means embodies supplemental locking means for said closer mechanism, and regulator mechanism operative to maintain the closer open during a predetermined period.

In the preferred form thereof herein shown and described the depending framework (designated generally by A) for supporting the operative mechanisms comprises a pair of side frame-hangers or downrights 2 and 3, having their upper ends each formed with one member 4 of a supply hopper or chute. Each of these chute or hopper members 4 is provided with flanges 5, whereby when such members are in juxtaposition the two downrights or side frame-hangers and chute members can be suitably secured together by fastening devices 6, thereby forming a rigid structure having at its upper end means, such as flanges 7, to permit such depending framework to be secured by suitable fastening devices to the ceiling or analogous support of a boiler or other room and so have the supply chute or hopper directly beneath the floor of the storage-room, such floor having a passage communicating with the chute for the purpose of supplying said chute with the fuel to be fed to the load-receiver and weighed. This supply-chute is cut away at one side and is provided with a pair of guide-walls 8 for guiding the fuel when delivered onto some suitable conveying or carrying means, by which it is carried into position to supply the load-receiver. In the construction shown this conveying means is shown as a traveling conveyer, such as a belt 9, constructed of any suitable material, but preferably of material which will be unaffected by the heat of the boiler-room, so that the same will not crack and stretch by the heat, as is liable to be the case with an ordinary leather belt. This traveling conveyer is carried by a pair of rolls 10 and 12, mounted on shafts 13 and 14, respectively, journaled in arms 15 and 15' and 16 and 16', respectively, of the framework. For actuating this traveling belt at predetermined times to feed the load-receiver with material suitable means is provided, which, in the preferred construction herein shown, comprises a worm-wheel 17, mounted on one end of the shaft 14 and in position to be engaged by a worm 18, connected with a motor-shaft 19. This motor-shaft 19, carrying a motor 20 of any suitable construction, comprises a sleeve 19', fixedly secured to a hollow driving-shaft 19'', journaled in brackets or arms 21 of one of the downrights, as 2. This driving-shaft 19'' has secured thereto adjacent to one end one (or the driving) member 22 of a clutch provided with teeth 22''. Carried by this hollow driving-shaft 19'' is a driven shaft 24, which has splined or otherwise secured thereto at one end thereof the worm 18, above mentioned, and has secured at its opposite end the other or driven clutch member 23. This clutch member 23 is provided with a pivoted pawl 25, adapted to be pressed into position by means of a spring 26, to engage the teeth 22' of the driving-shaft clutch member 22, from which it will be seen that when the motor is in operation the clutch member will rotate therewith, so long as the pawl thereof is in engagement with the clutch member 22, and thus rotate the worm 18 and worm-wheel 17 to operate the traveling feed-belt. The motor in the present construction is shown as an electric motor, which may be connected with any suitable source of electricity and has connected therewith a regulating device or switch 26', disposed in an accessible position, as on the wall, whereby said motor can itself be quickly thrown into and out of operation. Carried by the downrights 2 and 3, preferably adjacent to the lower ends thereof, by means of suitable bearings 30, shown herein as the usual adjustable knife-edge bearings, is beam mechanism, (designated generally by C,) comprising a main weight 150' and a pair of beam-arms 31 and 32, connected with such weight. Supported by this beam mechanism by means of suitable bearings 33, such as the usual adjustable knife-edge bearings, is a load-receiver, (designated generally by D,) which in the present construction is provided with laterally-extending arms $d$, carrying one member of each of the bearings. This receiver is supported with its discharge end in position permanently below the hanging or depending framework and is shown herein as an elongated, preferably tubular or circular, receptacle or chute tapering from its upper to its lower end. In practice this receptacle may be of any desired length in proportion to the height of the ceiling and the amount of material to be weighed at each load, but is of sufficient length to have its discharge end permanently below the hanging framework, its upper end preferably being above the lower end of such framework, whereby it is in position to receive fuel from the hopper, which receives it from the storage-room. This hopper thus constitutes a conduit between the storage-room and the receiving end of the load-receiver, while said load-receiver forms a conduit or chute between said hopper and the boiler-room floor, whereby the fuel is discharged below said framework and into position for use.

It will be understood that the receptacle could be made of any other desired shape instead of circular or tubular, as square or otherwise, if preferred, whereby it will be effective for the purposes hereinafter set forth. This elongated tapering receptacle may itself constitute the main conduit or conveying means between the storage-room and boiler-room floor for carrying the fuel into position for use; but as the fuel on the discharge therefrom may have a tendency to spread a suitable supplemental conduit 35 is preferably disposed below the discharge end of the receptacle and preferably rigidly secured in position to one of the walls of the boiler-room by suitable arms 36. The upper end of this conduit is preferably funnel-shaped, whereby spilling of the fuel is prevented, while the lower end of the conduit is at a sufficient height from the boiler-room floor to permit the proper discharge of the fuel from the conduit. In the present construction the receptacle is pivotally connected to a projection 37 of the supplemental conduit by means of a connector 38, whereby shifting or swaying movement of the receptacle is prevented. By means of this tapering elongated bucket not only does the same act as a conduit or conveyer to carry the fuel into position for use, but, owing to the tapering construction thereof, in which the diameter of the receptacle is less at its lower than at its upper end and is a decreasing one throughout the entire length of the receptacle, a thorough and complete discharge of the fuel is secured each time and the inner walls of the bucket maintained clean from the fuel, which is usually wet and sticky.

The load-receiver is provided with suitable closer mechanism, shown herein as a combined oscillatory and rotary closer mechanism. The closer proper comprises a suitable plate 40, normally inclinedly disposed in position to close the inclined mouth 41 of the receiver. This plate is provided with a spindle 42, journaled in a bearing forming the ends of a pair of arms 43 and 44, pivotally secured at their upper ends to a semicircular bracket 45, fixed to the receptacle, a counterbalancing-weight 46 being secured to one of said arms to maintain the closer shut. The closer-plate is provided with an annular ratchet 47 in position to be engaged by a pawl 48, pivotally secured to said bracket 45, and which pawl is weighted for the purpose of maintaining the same in engagement with said ratchet. From the foregoing it will be seen that on the opening of the closer, the pawl being in engagement with the ratchet, the closer will be rotated step by step a predetermined distance, so that at each discharge of the receiver a new closer-surface will be brought into contact with the coal, (see Fig. 8,) whereby such closer will be maintained clean from the sticky and wet coal. By providing this tubular receptacle with an inclined discharge-mouth it will be seen that it acts in connection with the normally-inclined closer when open to prevent the spreading of the discharging load.

In the construction shown suitable means is provided for throwing the traveling belt into and out of operation, thereby to regulate the feeding of the fuel to the receptacle and also to act as a means to instantly catch any part of such fuel that may fall over the edge of such traveling belt on the stopping thereof, and in the present construction this means comprises valve mechanism comprehending a catch-valve 50, fixedly secured to a rock-shaft 51, journaled in the arms 15 and 15' of the framework and in position to permit such valve to swing under the discharging end of the traveling belt. Rigidly secured to the valve is an adjustable weight 52 for maintaining such valve in its catch, or what would be ordinarily designated as its "closed" position. To hold the valve during the traveling movement of the belt in that position, which would ordinarily be designated as its "open" position, to permit the proper loading of the receiver, suitable means is provided, which is shown herein as a supplemental beam-arm 55, pivotally secured to one of the main beam-arms 32, preferably at a point about midway between a pair of the bearings supporting the beam and the load-receptacle and carrying at one end thereof a counterbalancing-weight or supplemental weight 150'', forming to a certain extent a part of the beam-weight 150 of the weighing mechanism. This supplemental beam-arm 55 is provided with an engaging surface or roll 56 at its free end in position to engage the lower end of a depending member, such as a thrust-rod 57, secured to the outer end of the valve rock-shaft 51, from which it will be seen that such supplemental beam-arm acts as a valve-actuator. This thrust-rod is maintained in position against shiftable movement by a suitable connector 58, pivotally secured thereto and to one of the downrights, as 2. In the present machine when the valve is wide open, being limited in its opening movement by a suitable stop 78, hereinafter described, the supplemental weight 150'' will be maintained in a slightly-raised position—that is to say, when it is in its normal position or position of rest it will be in a plane above the plane of the main weight 150' when in its normal position or position of rest, owing to the length of the thrust-rod 57 and the position of the stop 59 on the beam, so that the receptacle at each load will be lowered somewhat before the supplemental weight will act as a material part of the beam-weight 150, as such supplemental weight being in a raised position at the commencement of the loading period the receptable will require a less amount of material to raise the main weight than would be required to raise both the main and supplemental weights simultaneously from the same point. When the load-receptacle has received the necessary amount of material to nearly carry it to its poising-point, it descends, thereby raising the main beam-weight 150', as above stated, which at this time engages the supplemental weight 150'' by means of a stop 59, carried by said main weight, and which projects into a recess 60, formed in the supplemental weight, from which time said main and supplemental weights act as the beam-weight 150 for counterbalancing the load-receiver. From the above it will be seen that by this improved construction of beam mechanism the momentum of the weighing mechanism is materially decreased as the receptacle is gradually brought to its poise position, and therefore will not be carried by such momentum past its poising-point. It will also be seen that by this construction the valve, although controlled by the beam mechanism, is maintained open to its full extent after a partial descent of the load-receiver and a part of such beam mechanism, thus insuring a proper load to the receptacle, which has not been the case heretofore, as when the receptacle-supporting end of the beam commenced to descend the valve partially closed.

Since the beam mechanism constitutes the means for maintaining the valve open, it will be seen that after the load-receiver has partially descended toward its poising position said valve will commence to swing toward its catch position, owing to the descent and disengagement of the thrust-rod from the actuator. Therefore to maintain the valve open until the receptacle is completely loaded suitable supplemental means is provided for this purpose, which in the construction shown comprises a depending member or arm 75, secured to the valve and in position to engage a weighted by-pass 76, carried at the free end of one of the beam-arms, as 31, such by-pass being maintained in position by suitable stops 77 and 77'. By this means the valve after it has commenced to close is maintained open sufficiently far to permit the complete loading of the receptacle and until the load-receiver reaches its poising position, at which time a further descent of the forward ends of the beam-arms permits the by-pass to disengage the depending arm 75, and thereby permit the valve-weight 52 to swing the valve into its catch position. To limit the oscillatory movement of the valve, a suitable stop 78 is carried by the framework-arm 15 and in position when the valve is open to engage the face 79 of the sector-stop, thereby to limit the opening or outward movement of the valve, and when said valve is closed to engage the opposite face 80 of said stop, thereby to limit the inward movement of said valve.

To maintain the closer locked shut against the weight of the material in the receiver when the valve is open and to maintain such valve locked in its catch position when the closer is open, suitable locking means is provided. This locking means is shown herein comprising a pair of sector-stops 62 and 63, one, as 62, carried by the valve rock-shaft 51 and the other, as 63, pivotally carried by an arm 64 of the load-receiver and operatively connected with the closer by a connector 65, pivotally secured to said closer-stop 63 and to an extension of one of the closer-arms, as 44. When the closer is shut, the stop-face 63' of the closer-stop is in position to engage the curved face 62' of the valve-stop, and when the closer is open the stop-face 62'' of the valve-stop is in position, should the valve have a tendency to open, to engage the curved face 63'' of the closer-stop. The closer-stop 63 is provided with a depending arm 66, having a catch 67 in position to be engaged by a corresponding catch 68 of a locker 69, fixedly secured to a short rock-shaft journaled in a bracket carried by the receptacle. This locker is operative by a shiftable member or lever 70, fixedly secured to the opposite end of said locker rock-shaft. The free end of this lever is in position to be engaged by a projection 71, carried by one of the downrights, as 2, on the descent of the receptacle, from which it will be seen that this depending arm 66 and locker 69 act as supplemental locking means to maintain the closer shut on the closing of the valve, and the consequent disengagement of the stop-faces 62' and 63' of the valve and closer-stops, and until the receptacle commences to pass its poising position, at which time the locker 69 is shifted by the projection 71, whereupon the closer is opened by the weight of the load in the receiver.

To permit the valve mechanism, as hereinbefore stated, to regulate the feeding mechanism, thereby to throw the same out of operation on the closing or inward movement of the valve and into operation on the opening or outward movement of said valve, a suitable clutch-controller or controlling means is provided, which comprises a cam-faced member or controller 82, secured to a short rock-shaft 83, journaled in one of the downrights, as 2. Secured to the opposite end of this shaft is a controller-actuator 84 in position to be engaged by a working part 85, carried by the valve sector-stop 62. On the inward movement of the valve and the consequent upward movement of the valve sector-stop 62 the working part 85 is brought into engagement with the controller-actuator 84, Fig. 7, thereby shifting the cam-faced controller 82 upward and into position to interrupt the rotation of the cam-faced pawl 25 of the driving clutch member 23 and shift such pawl, against the pressure of its spring 26, out of engagement with the motor or driving clutch member 22, whereby further rotation of the worm 18 and the traveling movement of the belt is stopped. It will be seen that the feeding mechanism is thrown out of operation before the valve reaches its final catch position and that the further upward movement of the sector-stop 62, which takes place as the valve moves toward said final catch position, does not shift the actuator 84, as the same has its curved face 84' formed on the same arc as the curved face 62' of the valve-stop. On the opening of the valve and the consequent disengagement of the valve-stop working part 85 from the controller-actuator 84 the cam-faced controller 82 descends, being limited in such descent by a suitable stop 86, carried by the downright 2, and thereby releases and permits the pawl 25 to be pressed by its spring 26 into engagement with the teeth 22' of the driving clutch member 22, thus throwing the traveling belt into operation to feed a new load to the receptacle.

Suitable regulator mechanism is provided for regulating the shutting of the closer, and in the construction thereof herein shown it preferably comprises a cone-shaped member 90, disposed in the supplemental conduit 35 and connected with the closer adjacent to the point of juncture of the arms 43 and 44 by a connector 91, from which it will be seen that as long as any fuel remains above the cone-face of the regulator the closer will be maintained open against the action of its weight.

The operation of this improved weighing-machine is substantially as follows: The mechanisms being in the position shown in Fig. 5, with the load-receptacle receiving a load, when said receptacle has received a sufficient amount of material to permit the same to partially descend toward its poise position the main weight 150' is first raised to engage the supplemental weight 150'', Fig. 6, from which time both weights constitute the beam-weight 150. When the receptacle has received a sufficient load to cause its descent substantially to a poise position, the catch-valve, owing to the previous disengagement of the thrust-rod 57 with the valve-actuator 55, has partially closed, thereby bringing its depending arm 75 into position to engage the by-pass 76, carried by the beam-arm 31, Fig. 7. At this time the valve has carried its sector-stop 62 upward into position to shift the clutch-controller actuator 84 and disengage the clutch members 22 and 23, whereupon the traveling movement of the belt and the consequent feeding of the fuel to the receptacle cease. As the receptacle descends below its poising-point the by-pass 76 of the beam-arm releases the valve-arm 75 and permits the catch-valve to swing into position to completely cut off the supply of fuel to the receiver. When the valve has reached its final catch position, the descent of the receptacle has carried the lever 70 into position to engage the projection 71, whereupon the unlocking of the closer takes place, which closer is then forced open by the weight of the load in the receptacle and rotated, as above set forth, the opening of the closer carrying the closer-stop 63 into position to lock the valve in its catch position during the period said closer remains open. When the load has been completely discharged, the regulator permits the shutting of the closer, and thereby the unlocking of the valve, which is opened by the beam mechanism through the actuator 55 on the descent of the main and supplemental weights, the former to a point below the latter, and in a manner that will be readily understood without a more particular description. This opening of the valve permits the reëngagement of the clutch members 22 and 23 and the consequent feeding of a new load to the receiver.

In conclusion it will be seen that in this improved construction of weighing apparatus the motor is directly carried by the depending framework, thereby doing away with the necessity of using driving-belts, which are liable to become cracked and unfit for use by the heat, and that, moreover, by this improved organization of mechanism instead of a weighing-machine base, necessitating the use of a shelf or other support underneath such base, depending or hanging framework is provided adapted to be secured to the ceiling of a boiler or other room and whereby the load-receiver may have its discharge end permanently below said hanging or depending framework. Furthermore, it will be seen that by this improved construction of load-receiver the same acts both as a receptacle and a conduit for the material.

Having thus described my invention, I claim—

1. In a weighing-machine, the combination of depending framework adapted to be supported from above and non-supported at its lower end, and embodying a supply-chute having the discharge end of its stream-passage intermediate the upper and lower ends of said framework; a shiftable conveyer; a motor carried by said depending framework for operating said conveyer; weighing mechanism carried by said depending framework and including a load-receiver having an inclined discharge-mouth, and having its upper load-receiving end in position permanently above the lower end of said framework, whereby it is in position to receive material in close proximity to the discharge end of said supply-chute, and its lower, load-discharging end permanently in position below said framework whereby said receiver discharges its load below said framework.

2. In a weighing-machine, the combination with depending framework adapted to be supported from above and non-supported at its lower end and embodying a supply-chute, of weighing mechanism supported by said framework; feeding means for feeding material from said supply-chute to the weighing mechanism and comprising a shiftable conveyer, an electric motor, and clutch members forming connection between said motor and conveyer, one of said members having a pawl for engaging the other member; clutch-controlling means carried by said framework and shiftable into position to engage said pawl and disengage the clutch members, and thereby throw said conveyer out of operative connection with said motor and consequently out of operation; a stream-controlling valve; and means directly carried by and shiftable with said valve to engage said shiftable clutch-controlling means, thereby to shift the same into position to disengage the clutch members.

3. In a weighing-machine, the combination with framework embodying a supply-chute, of weighing mechanism; a traveling conveyer for conveying material from the supply-chute to the weighing mechanism; means for operating said conveyer and comprising a driving-shaft supported in position, an electric motor and a clutch member mounted thereon, a driven shaft supported in position relatively to said driving-shaft and carrying a companion clutch member and a worm; a worm-wheel in operative engagement with said conveyer and worm for imparting motion from the motor to the conveyer; a pawl carried by one of said clutch members and adapted to engage the other clutch member, thereby to throw said conveyer into operative connection with the motor; shiftable clutch-controlling means carried by said framework and operative to disengage said clutch members and thereby throw the conveyer out of operative connection with the motor; and stream-controlling means operative to throw said clutch-controlling means into position to disconnect said clutch members.

4. In a depending weighing-machine, the combination of hangers or downrights adapted to be fixedly secured from above and non-supported at their lower ends and having a supply-chute; weighing mechanism carried by said downrights and embodying a relatively long, cylindrical chute load-receiver having its upper load-receiving end in position above the lower ends of said downrights to receive the load from said chute, and its lower load-discharging end in position below said downrights; a traveling belt for feeding material from said supply-chute to the receiver; means for operating said belt and comprising an electric motor carried by one of said downrights, a worm operatively connected therewith, a worm-wheel in operative connection with said belt and worm, and clutch mechanism for forming connection between said worm and motor; clutch-controlling means for throwing said clutch mechanism into and out of operation; and stream-controlling means operative to cut off the supply of material to said receiver, and also to operate said clutch-controlling means, thereby to control the operation of the clutch mechanism and the conveyer-belt.

5. In a weighing-machine, the combination of hangers or downrights adapted to be fixedly secured from above and non-supported at their lower ends, and having a supply-chute; weighing mechanism carried by said downrights and embodying a relatively long, movable, cylindrical chute load-receiver having its upper load-receiving end in position above the lower end of said downrights to receive the load from said chute, and its lower load-receiving end in position below said downrights; a traveling belt for feeding material from said supply-chute to the receiver; means for operating said belt and comprising a motor carried by one of said downrights, a worm operatively connected therewith, a worm-wheel in operative connection with said belt and worm, and clutch mechanism for forming connection between said worm and motor; clutch-controlling means for throwing said clutch mechanism into and out of operation; stream-controlling means operative to cut off the supply of material to said receiver and also to operate said clutch-controlling means, thereby to control the operation of the clutch mechanism and the conveyer-belt; and a relatively long, non-movable cylindrical supplemental chute disposed below said movable load-receiver chute and having a linkage connection therewith, thereby to control lateral movement of said movable chute.

6. In a weighing-machine, the combination of a supply-chute; weighing mechanism; feeding means for feeding material from said chute to the weighing mechanism, and comprising a traveling conveyer, a motor, and clutch members intermediate said motor and conveyer for controlling the operation of said conveyer, and having a cam-faced pawl; clutch-controlling means embodying a cam-faced member shiftable into position to engage said pawl and disengage the clutch members and thereby throw said conveyer out of operation; a valve; a stop carried by said valve, and having a working part adapted to engage the clutch-controlling means to shift the same into position to disengage the clutch members on the closing of the valve, and adapted on the opening of said valve to release said clutch-controlling means, thereby to permit the reëngagement of the clutch members and the operation of the conveyer.

7. In a weighing-machine, the combination of a load-receiver; and beam mechanism for supporting said receiver, and comprising a pair of parallelly-extending arms, one of said arms carrying a main weight and the other carrying a supplemental weight, said supplemental weight normally having a position of rest above the position of rest of the main weight, whereby in operation said load-receiver is gradually brought to a poise.

8. In a weighing-machine, the combination of a load-receiver; and beam mechanism for supporting said receiver, and comprising a pair of parallelly-extending, pivotally-connected arms, one of said arms carrying a main weight fixedly secured thereto, and the other of said arms carrying a supplemental weight fixedly secured thereto, said supplemental weight normally having a position of rest above the position of rest of the main weight, whereby said receiver, during a part of its weighing movement, first acts to raise the main weight to the normal position of rest of the supplemental weight, and then, during the rest of its weighing movement, acts to raise both of said weights simultaneously, whereby the receiver is gradually brought to a poise.

9. Weighing mechanism comprising a load-receiver, and beam mechanism for supporting said receiver, said beam mechanism embodying a pair of weights, one having its normal position of rest above the position of rest of the other weight, and both of said weights having connection with said beam mechanism when in its position of rest and throughout the entire movement thereof to and from said position of rest, whereby one of said weights has an ascending movement independently of the other weight at one predetermined period, and whereby both of said weights have simultaneous movements at another predetermined period, thereby to permit the receiver to be brought gradually to a poise.

10. Weighing mechanism comprising a load-receiver, and beam mechanism for supporting said receiver, said beam mechanism embodying a pair of weights, one of said weights having its normal position of rest in a plane above the normal position of rest of the other weight, and both of said weights having a permanent connection with the beam mechanism, whereby both are movable with said beam mechanism to and from its position of rest, whereby said lower weight has an ascending movement independently of the upper weight during a predetermined period, and an ascending movement with said weight during another predetermined period, thereby to bring the load-receiver gradually to a poise.

11. In a weighing-machine, the combination of a load-receiver; and beam mechanism supporting said receiver and comprising a pair of arms disposed side by side and carrying a plurality of weights fixedly secured to said arms and connected one to the other for simultaneous movement during a part of the operation of the load-receiver, and one of said weights having an ascending movement independently of the other weight during another part of said operation of the load-receiver.

12. In a weighing-machine, the combination of a load-receiver; and beam mechanism supporting said receiver and comprising a pair of independent weights, one of said weights having its normal position of rest in a plane above the normal position of rest of the other weight; and means carried by said weights for maintaining them together for simultaneous movement during a part of the operation of the load-receiver.

13. In a weighing-machine, the combination of a load-receiver; and beam mechanism supporting said receiver and comprising a beam-arm, a main weight carried thereby, a supplemental arm pivotally secured to said beam-arm and extending in parallelism therewith, and a supplemental weight carried thereby, said weights having their normal positions of rest in separate planes, one above the other, whereby, during the first part of the operation of the main weight, said supplemental weight is stationary; and means carried by said weights for maintaining them together on the ascent of said main weight to the normal position of rest of the supplemental weight, whereby said weights act together during a part of the operation of the load-receiver.

14. In a weighing-machine, the combination of valve mechanism; a load-receiver; weighted beam mechanism supporting said receiver and constructed and operative to maintain the valve in its wide-open position during a partial descent of the load-receiver and the non-weighted end of one part of said beam mechanism.

15. In a weighing-machine, the combination of valve mechanism; and weighing mechanism embodying beam mechanism operative to control the opening and closing of said valve, and comprising a main and a supplemental weight, the supplemental weight normally having a position of rest above the position of rest of the main weight, and in operative engagement with the valve while in such position of rest to maintain said valve open to its full extent during a partial descent of the non-weighted end of a part of the beam mechanism.

16. In a weighing-machine, the combination of valve mechanism; a load-receiver; beam mechanism supporting said receiver, and operative to control the opening and closing of said valve, and comprising a main and supplemental weight, the supplemental weight normally having a position of rest above the position of rest of the main weight, and in operative engagement with the valve while in such position of rest to maintain said valve open to its full extent during a partial descent of said receiver and the non-weighted end of a part of the beam mechanism; and means connected with said valve and beam mechanism, and operative after the valve commences to close to maintain said valve partially open during a further descent of the load-receiver.

17. In a weighing-machine, the combination of a valve; weighing mechanism embodying beam mechanism comprising a beam-arm, a main weight carried thereby, a valve-actuator secured to said beam-arm and carrying a supplemental weight having its normal position of rest above the normal position of rest of the main weight; and a thrust-rod connected with said valve and in engagement with said actuator, and operative to maintain said valve open to its full extent during a partial descent of the non-weighted end of the arm.

18. In a weighing-machine, the combination of a valve; a load-receiver; beam mechanism supporting said receiver and comprising a beam-arm, a main weight carried thereby, a valve-actuator secured to said beam-arm and carrying a supplemental weight having its normal position of rest above the normal position of rest of the main weight; a thrust-rod connected with said valve and in engagement with said actuator and operative to maintain said valve open to its full extent during a partial descent of the load-receiver and a part of the beam mechanism; a by-pass carried by the beam mechanism; and an arm connected with the valve and adapted after the valve commences to close to engage the by-pass on the disengagement of the thrust-rod and actuator, thereby to maintain the valve partially open during a still further descent of the load-receiver.

19. In a depending weighing-machine, the combination of hangers or downrights having a chute; beam mechanism carried by said downrights, and comprising a main and a supplemental weight, the supplemental weight having its position of rest above the normal position of rest of the main weight; an elongated, tapering load-receiver carried by said beam mechanism and having a closer; a driving-shaft journaled on one of said downrights and carrying a motor and a clutch member; a driven shaft carrying a coacting clutch member and a worm; a traveling belt for conveying material from said chute to said load-receiver; a worm-wheel for imparting motion to said belt and in engagement with said worm; a valve operative to cut off the material from said receiver, and controlled in its opening and closing movements by the beam mechanism and adapted to be maintained open to its full extent by said beam mechanism during a partial descent of the load-receiver and a part of such beam mechanism; clutch-controlling means operative to throw said clutch members into and out of engagement; and a stop carried by said valve and operative, on the closing of the valve to shift said clutch-controlling means into position to disengage the clutch members, and thereby throw the belt out of operation, and operative on the opening of the valve, to permit the clutch-controlling means to allow the reëngagement of the clutch members, thereby to throw said belt into operation.

FRANCIS H. RICHARDS.

Witnesses:
C. A. WEED,
LOUIS F. WHITMAN.